Dec. 22, 1953  W. DE BACK  2,663,480
CONTAINER FILLING MACHINE
Filed March 27, 1950  3 Sheets-Sheet 1

FIG_1

Inventor
WILLIAM de BACK
By
Hans G. Hoffmeister
Attorney

Dec. 22, 1953 W. DE BACK 2,663,480
CONTAINER FILLING MACHINE
Filed March 27, 1950 3 Sheets-Sheet 3

Inventor
WILLIAM de BACK
By
Hans G. Hoffmeister.
Attorney

Patented Dec. 22, 1953

2,663,480

UNITED STATES PATENT OFFICE 2,663,480

CONTAINER FILLING MACHINE

William de Back, San Jose, Calif., assignor to Food Machinery and Chemical Corporation, San Jose, Calif., a corporation of Delaware Application March 27, 1950, Serial No. 152,063

18 Claims. (Cl. 226—98)

The present invention relates to a container filling machine, and more particularly to a mechanism for supplying proper quantities of liquids, such as brine or syrup, to containers, either empty or partly filled with food products.

An object of the invention is to provide improved container filling apparatus.

Another object is to supply proper quantities of either hot or cold liquid to containers of food products.

Another object is to provide mechanism for filling containers to a predetermined level with liquid while subjecting the interior of the container to controlled vacuum.

Another object is to provide a vacuum filler valve which is simple to fabricate, assemble and disassemble, and is easily cleaned by flushing.

Another object is to provide a filler valve which is capable of easy and accurate adjustment.

Another object of the invention is to provide a filler valve which will accurately fill containers presented thereto without objectionable afterdrip.

A further object is to provide container filling mechanism which is capable of easy interchange from a balanced vacuum system for supplying cold liquids to an unbalanced vacuum and atmospheric pressure system for supplying hot liquids to containers of food products.

These and other objects and advantages of the invention will be apparent from the following description and the accompanying drawings, wherein:

Figure 1:
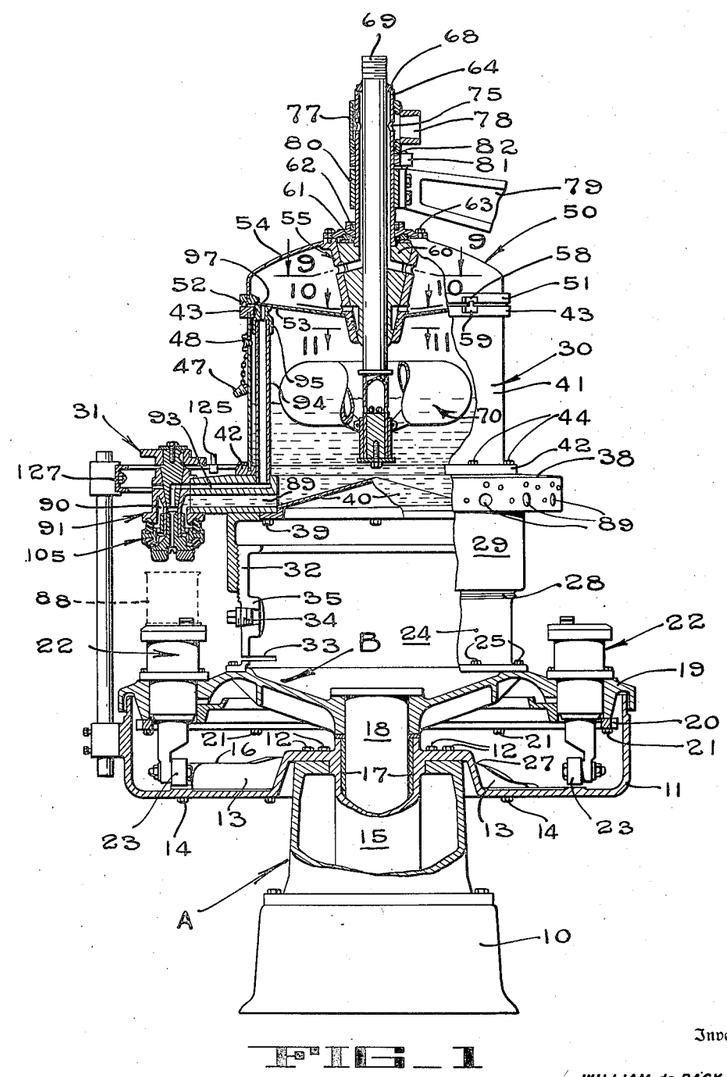
Fig. 1 is a side elevation of a vacuum can filling machine embodying the invention, parts thereof being broken away, only one filling valve and its associated parts being shown installed thereon.

The container filling mechanism of the present invention is illustrated in Fig. 1 as embodied in a generally conventional type of rotary turret can filling or syruping machine comprising a stationary base A, with a rotatable turret B journaled on the base to rotate about a vertical axis. This general type of machine is well known to those familiar with the art, and is disclosed, for example, in Thompson Patent 1,355,015, dated October 5, 1920.

The base A (Fig. 1) comprises a standard 10 having a pan 11 secured transversely thereon by screws 12. A usual concentrically curved can elevating cam track 13 is secured to the upper side of the pan 11 by screws 14. The cam track 13 (Figs. 1 and 12) has a usual vacuumizing portion 16, filling portion 26 and venting portion 27. A vertical turret bearing support sleeve 15 is formed integrally with the pan, and has bearing bushings 17 inserted therein. A shaft 18 is journaled to rotate freely in the bushings 17.

Figures 2, 3, 4, 5, 6:
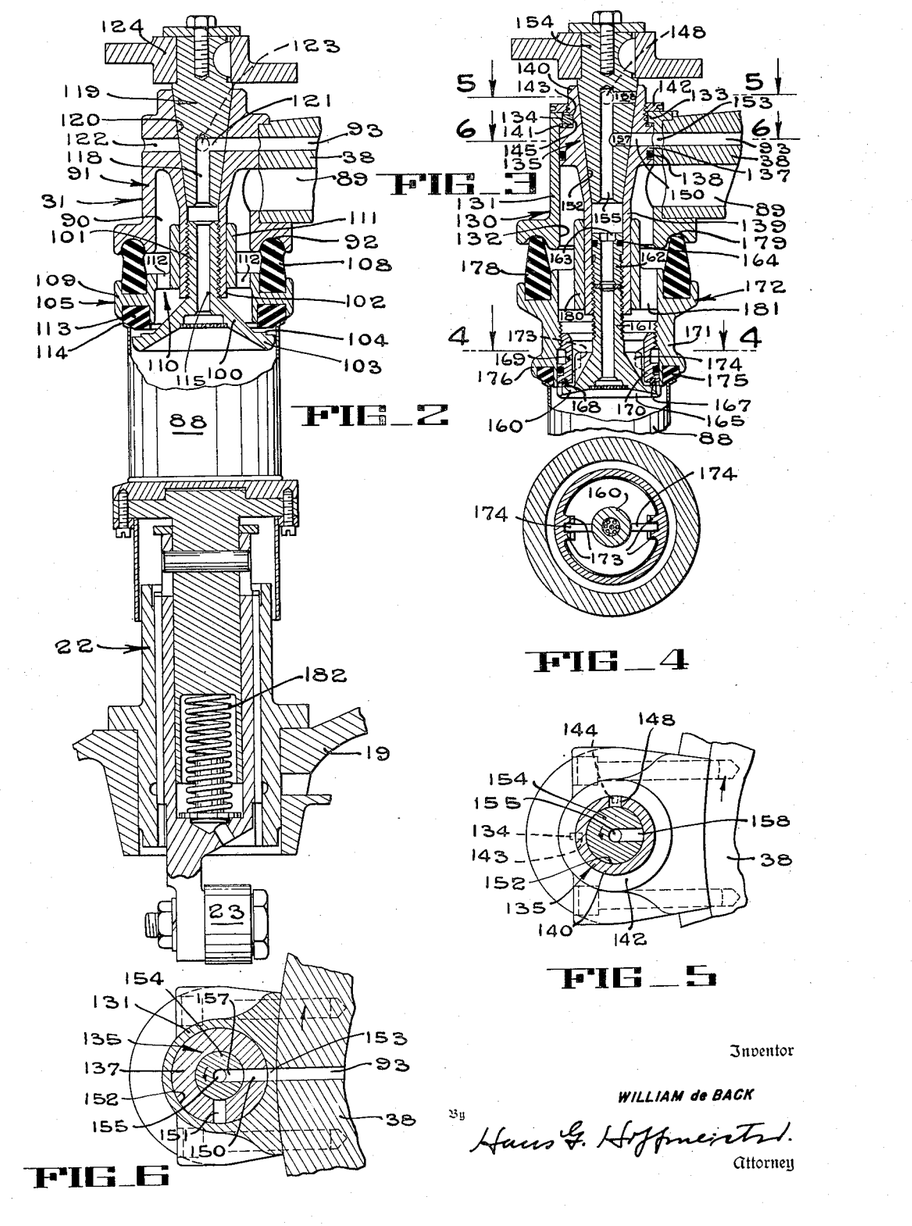
Fig. 2 is an enlarged vertical radial section through the filler valve and container lift mechanism shown in Fig. 1.
Fig. 3 is a fragmentary sectional view similar to the upper portion of Fig. 2, but showing a modified form of filler valve.
Fig. 4 is a somewhat enlarged sectional view taken along the line 4—4 of Fig. 3.
Fig. 5 is a sectional view taken along the line 5—5 of Fig. 3.
Fig. 6 is a sectional view taken along the line 6—6 of Fig. 3.

A rotary can lift support table 19 is secured on the upper end of the shaft 18. A turret drive ring gear 20 is secured to the under side of the can lift table by screws 21, and is driven by a usual motor driven pinion, not shown. A plurality of can lift assemblies 22 shown sectionally in Fig. 2 are mounted in openings in the can lift table 19 in a usual manner and are provided with cam follower rollers 23 on their lower ends to ride on the cam track 13.

A cylindrical tank support member 24 is mounted concentrically on the can lift support table 19 by screws 25. The upper end of this tank support member is threaded externally at 28 and has normally free threaded engagement with an internally threaded skirt 29 having a liquid supply tank 30 and filler valves 31 mounted thereon. The cylindrical tank support member 24 is slitted vertically at 32 and has a connecting horizontal slot 33 therein. A tapered plug 34 is screwed into a correspondingly threaded hole in the two complementary halves of a boss 35 welded to the tank support 24 on opposite sides of the vertical slit 32 therein. By screwing in the tapered plug 34 the upper portion of the cylindrical support 24 can be expanded to grip the internally threaded skirt 29 and thereby secure the tank assembly in rotatively adjusted position on its support.

An annular tank and filler valve mounting ring 38 is secured concentrically on the upper end of the skirt member 29 by screws 39, and a conical tank bottom 40 is secured across the central opening of the support ring 38 by silver soldering. The tank 30 comprises a cylindrical side wall member 41 with its ends secured in grooves in lower and upper rims 42 and 43, respectively. The lower tank rim 42 is secured by screws 44, to the annular tank and filler valve mounting ring 38. A tapered sealing plug 47 is adapted to be screwed into a correspondingly threaded vent hole 48 through the side wall of the tank, and is removed as shown in Fig. 1 for unbalanced operation of the filling mechanism in a manner to be described later herein. From this point on the mechanism embodies several novel features which will be described in detail.

A compartmented tank cover 50 comprises an annular rim 51 with a resilient gasket 52 mounted on its lower face. The gasket 52 is adapted to have sealing engagement with the upper rim 43 of the liquid supply tank 30. The cover 50 has a dished bottom 53 and domed top 54 fitted into the rim 51 and secured thereto by silver soldering.

A conical vacuum and drain valve housing 55 is fitted into central openings in the top and bottom walls of the cover 50, and is soldered thereto to be disposed co-axially of the cover compartment. A toothed cover positioning plate 56, secured to the periphery of the cover rim 51, has interfitting relation with a notched plate 59 secured to the periphery of the upper tank rim 43 to facilitate mounting the cover in proper position on the tank, and to prevent relative rotative movement therebetween during operation of the mechanism. A non-rotative conical valve core 60 (Figs. 1, 8, 9, 10 and 11) is seated in the valve housing 55 and is retained in seated position therein by a compression bearing ring 61 (Fig. 1), the upper face of which engages the under side of a valve housing cover plate 62 secured to the valve housing by screws 63.

The lower end of a vacuum pipe 64 (Figs. 1 and 8) is secured in the enlarged upper portion 65 of an axial hole 67 through the valve core 60. The upper end of the vacuum pipe 64 is soldered to a collar 68 which encircles a liquid supply pipe 69 and is also soldered thereto. The upper end of the liquid supply pipe is adapted to be connected to a usual source of liquid, while its lower end extends downwardly through the axial hole 67 in the valve core 60, and is welded to the core. The lower end of the liquid supply pipe 69 extends downward into the tank 30 and has a usual float valve 70 mounted on its lower end to maintain the liquid in the tank at a constant level during operation of the mechanism.

Figure 8:
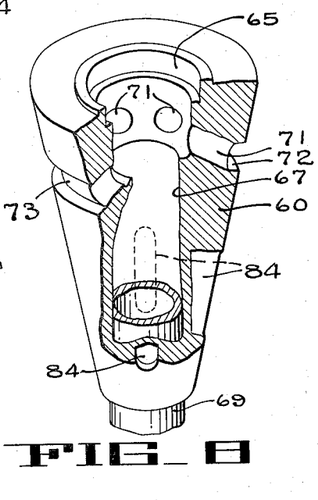
Fig. 8 is a similarly enlarged perspective view of a conical valve core adapted to seat in the housing shown in Fig. 7, portions being broken away.
Figure 9:
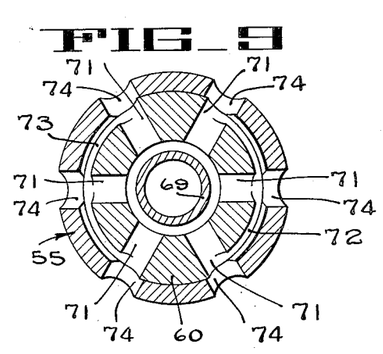
Figs. 9, 10 and 11 are enlarged sections taken along correspondingly numbered lines of Fig. 1.
Figure 10:
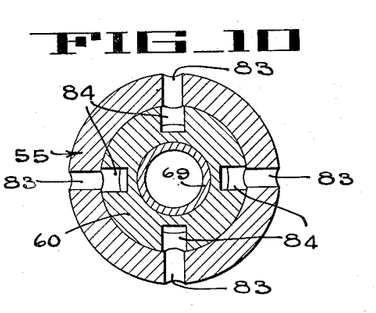
Figure 11:
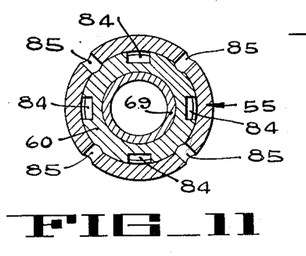

The vacuum pipe 64 is spaced outwardly from the liquid supply pipe 69, and the space between the two pipes communicates at its lower end with the space between the wall of the enlarged upper portion 65 of the axial core hole 67 and the liquid supply pipe 69. This space in turn communicates with a plurality of outwardly extending passages 71 in the valve core 60 (Figs. 8 and 9). The outer ends of these passages 71 open into a pair of circumferential grooves 72 and 73 extending part way around the valve core to maintain constant communication between the passages 71 and a plurality of ports 74 in the valve housing. A plurality of openings 75 through the vacuum pipe 64 near its upper end communicate with a chambered T-fitting 77 which surrounds the vacuum pipe and is sealed thereto. These latter openings 75 communicate with a vacuum supply line 78 which is connected in a usual manner to a suitable source of vacuum, such as a vacuum pump, not shown.

A cover support arm 79 is secured to a sleeve 80 which surrounds the vacuum supply pipe 64. The cover support arm 79 is mounted on a standard or other suitable support, not shown, so that the entire cover assembly 50 can be raised by elevating this support arm, or moved downwardly to the position shown in Fig. 1 to compress the cover gasket 52 and seal the cover assembly to the tank. A clamp collar 81 is clamped around the vacuum pipe 64 just above the sleeve 80, and a torque pin 82 is inserted through registering holes in the clamp collar 81 and the support arm 79 to secure the vacuum pipe 64 and its associated parts against rotation.

Figure 7:
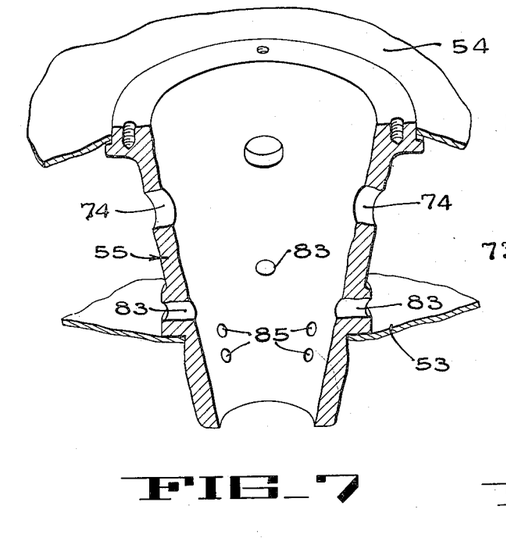
Fig. 7 is an enlarged fragmentary perspective view of a conical valve housing mounted in a tank cover compartment, portions being broken away.

A plurality of upper drain ports 83 are provided in the conical valve housing 55 (Figs. 1, 7 and 10) just above the bottom plate 53 of the tank cover compartment to drain off any liquid which may be drawn into the cover compartment during operation of the mechanism. These ports register, at predetermined stages of rotation of the valve housing 55 around the stationary core 60, with pocket recesses 84 formed in the valve core. These pocket recesses also register, at other stages of rotation of the valve housing 55 intermediately of their positions of registry with the upper drain ports 83, with lower drain ports 85 (Figs. 7 and 11) through the housing 55 which open below the cover compartment bottom plate 53 into the liquid in the supply tank 30. The two sets of drain ports 83 and 85 in the valve housing are offset angularly from each other so that both sets thereof never are in register with the core pocket recesses 84 at the same time. This prevents the by-passing of air through these ports and consequent loss of vacuum in the cover compartment during unbalanced operation of the mechanism in a manner to be described later herein.

A plurality of the filler valves 31 corresponding to the number of can lifts 22 are secured on seats machined on the periphery of the annular filler valve and tank support ring 38. Twenty is a common number of filler valves to provide on a machine. These filler valves are adapted to be aligned vertically above the can lifts so that a lower outlet of each of the filler valves will register with the mouth of a container 88 positioned in a usual manner on a lift 22. A liquid passage 89 (Figs. 1, 2 and 3) communicates from the interior of the liquid supply tank 30 to a downwardly opening liquid passage 90 (Figs. 1 and 2) through the body portion 91 of each of the filler valves. A downwardly facing grooved seat 92 is provided around the outlet of each of the liquid passages 90.

A vacuum passage 93 establishes communication between a conical valve recess 120 in the upper end of each filler valve body and the lower end of a vertical standpipe 94 mounted in a recess in the support ring 38. Only one valve and one standpipe are shown in the mechanism illustrated in Fig. 1, although a similar standpipe is provided for each of the valves on the machine.

A resilient sleeve 95 is adapted to be fitted onto the upper end of each of the standpipes and is pressed thereby into sealed relation with the under side of the bottom plate 53 of the cover compartment to surround a hole 97 therein. When the resilient sleeves 95 are thus positioned they provide individual sealed communication between the vacuumized interior of the cover compartment and each of the vacuum standpipes 94, and also seal the standpipes from the interior of the liquid supply tank. When these sleeves 95 are removed, the cover compartment will be in open communication with the interior of the liquid supply tank through the holes 97 in the bottom plate of the cover assembly, and the vacuum standpipes also will be in open communication with the interior of the liquid supply tank above the liquid level therein.

An adjustably mounted fixed valve 100 (Fig. 2) has an externally threaded stem portion 101 thereof screwed into axially adjusted position in an internally threaded vertical tubular valve support portion 102 which, in the embodiment illustrated in Figs. 1 and 2, is formed integrally with the valve body 91 and projects concentrically downward through the bottom outlet of the liquid passage 90. The fixed valve 100 has an enlarged head portion 103 on its lower end with an upwardly facing seat 104 machined on the upper marginal portion thereof.

A continuous seal or conduit 105 is provided between each filler valve 31 and the upwardly facing valve seat 104. This seal comprises a resilient sleeve 108 mounted with its upper edge seated in the downwardly facing annular groove 92 surrounding the outlet of the liquid passage 90, and its lower edge seated in an annular groove in the upper side of the rim 109 of an annular guide member 110. The guide member has a central hub portion 111 mounted to slide axially on the tubular valve stem support 102. A plurality of liquid passage openings 112 are provided in the portion of the guide member 110 which connects the rim 109 and the hub 111 thereof.

Figure 12:
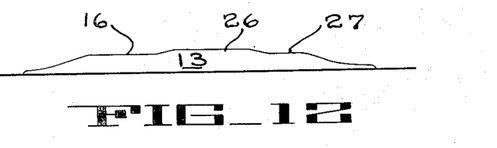
Fig. 12 is a diagrammatic view of a lift cam embodied in the machine illustrated in Fig. 1.

A resilient annular sealing gasket 113 is mounted in an annular groove formed in the under side of the rim 109 of the guide member 110. The gasket 113 is adapted to seat on the upwardly facing valve seat 104 on the valve head 103, and is beveled at 114 radially beyond the valve head 103 to have sealing, centering engagement with the mouth of a container 88 (Figs. 1 and 2) such as a can, or glass container, when elevated by the container lift 22 associated with the filler valve. The resiliency of the seal 105 normally urges the gasket 113 downwardly into sealing engagement with the upwardly facing valve seat 104 on the fixed valve head 103, but is adapted to be compressed to allow elevation of the gasket from its seat when the lift roller 23 (Fig. 1) rides onto the highest portion of the lift cam track 13 (Figs. 1 and 12).

A passage 115 is provided axially through the fixed valve member 100 and is adapted to communicate with an axial hole 118 in a valve core 119 which is seated in a correspondingly shaped valve recess 120 in the upper end of the filler valve body 91. A radial passage 121 opens into the axial passage 118 in the valve core 119 and this radial valve core passage is adapted to communicate through the vacuum passage 93 with the lower end of the standpipe 94 in one rotatively adjusted position of the valve core.

A vent port 122 is provided in the valve body 91 diametrically opposite the vacuum passage 93 into the standpipe, and an alternate radial vent passage 123 (Fig. 2) also is provided in the valve body 91 to register with the radial core passage 121 after the core has been turned through an angle of 90 degrees from a position of register with the passage 93. This alternate 90 degree vent passage 123 is adapted to be closed by a tapered, threaded sealing plug, not shown, when the mechanism is operated under unbalanced pressure conditions, and to remain open when operating under balanced pressure conditions, as will be explained later herein.

A usual vacuum and vent valve actuating star wheel 124 is keyed to an axially upwardly extending shaft portion of the valve core 119 and is adapted to turn the valve core through successive rotative movements of 90 degrees each upon contact with each of a succession of operating pins 125 (Fig. 1), mounted in a usual manner on a curved channel support track 127 which partially surrounds the machine.

A modified form of filler valve 130 is shown in Figs. 3, 4, 5 and 6. In this embodiment of the invention a valve body 131 is secured on the peripheral edge of the tank and filler valve support ring 38 in the same manner as that described for the filler valve 31 in Figs. 1 and 2. In the modified form of filler valve a hole 132 extends vertically through the filler valve body 131, with an annular flange 133 extending inwardly around the upper end of the hole 132. A key seat notch 134 is provided in the flange 133 to receive a key 145 for positioning a valve insert member 135 in the hole 132 in a manner to be described later herein.

The insert member 135 has a cylindrical central portion 137 which is adapted to be inserted upwardly into the hole 132 to the position shown in Fig. 3. The central insert portion 137 is sealed to the wall surrounding the hole 132 by a hydraulic sealing ring 138 mounted in a circumferential groove around the lower end of the central insert portion. The insert member 135 also has an internally threaded tubular downwardly extending fixed valve support portion 139, and an upwardly extending neck portion 140 of reduced diameter. The neck portion 140 is adapted to be inserted through the opening in the flange 133 to project above the upper end of the valve body. A sealing gasket 141 is provided between the lower side of the annular flange 133 and the insert 135. The upwardly extending neck portion 140 of the insert is externally threaded to threadedly receive a securing nut 142 having spanner wrench receiving recesses in the periphery thereof.

A pair of key seating notches 143 and 144 are provided in the lower end of the neck portion 140 and are offset angularly from each other by an angle of 90 degrees. The nut 142 secures the insert 135 in the valve body 131 in one of two angularly adjusted positions, as determined by the position of a key 145 (Figs. 3 and 5) which is adapted to be inserted in the key receiving notch 134 in the valve body flange 133, and also in one or the other of the two key receiving notches 143 and 144 in the neck 140.

A vent port 148 (Fig. 5) is provided through the neck portion 140 of the insert 135 above the spanner nut 142 thereon, and a pair of alternately effective vacuum passages 150 and 151 (Fig. 6) are provided through the central portion 137 of the insert member 135. These vacuum passages 150 and 151 open at their radially inward ends into a tapered valve core seat 152 in the upper end of the insert 135. Depending upon the keyed angular position of the insert 135 in the valve body 131, one or the other of these passages 150 or 151 is adapted to register with a vacuum passage 153 through the valve body, which in turn registers with the vacuum passage 93 in the mounting ring 38.

A tapered valve core 154 is adapted to seat on the tapered core seat 152. The core 154 has an axial passage 155 which extends upwardly from its lower end and communicates with a pair of radial passages 157 and 158, both with their axes in the same radial plane. The upper radial core passage 158 is adapted to register with the vent port 148 in predetermined rotatively adjusted positions of the valve core 154, and the lower radial core passage 157 is adapted to register successively with the vacuum passages 150 and 151 in the insert 135 upon predetermined rotative movements of the core.

With the valve insert 135 rotatively adjusted to the position shown in Figs. 3, 5 and 6, wherein the key 145 is inserted in aligned notches 134 and 143, when the valve core 154 is in the vacuumizing position, illustrated in Figs. 3, 5 and 6, the lower radially extending valve core passage 157 will be in register with the vacuum port 150 in the insert 135 and thence with the registering vacuum passage 153 through the valve body. In this position of the valve, the upper radial valve core passage 158 will be out of register with the vent port 148 in the neck of the insert 135 and will therefore be closed. A 90 degree counterclockwise rotative movement of the core 154 from the vacuumizing position shown in Figs. 3, 5 and 6 will seal off the lower radial valve core passage 157, and will bring the upper radial valve core passage 158 into register with the vent port 148 in the neck 140 of the insert 135. Two further 90 degree rotative movements of the valve core 154 will return the valve core to its starting position with both radial core passages 157 and 158 closed.

By removing the spanner nut 142, withdrawing the insert 135 from the valve body 131, turning it 90 degrees in a counterclockwise direction, and re-inserting it with the key in the notches 134 and 144, it will be obvious that the vacuum passage 150 in the insert 135, which, in the position of the key illustrated in Figs. 3, 5 and 6 was in register with the vacuum passage 153 through the valve body 131, will be 90 degrees out of register with the vacuum passage 153, and will be sealed off by the wall of the hole 132. However, the alternate vacuum passage 151 in the insert 135, will, in the newly adjusted position of the insert, be in register with the body vacuum passage 153.

Also, in the newly adjusted position of the insert 135 the vent port 148 in the neck 140 will be angularly offset from the insert vacuum port 151 by an angle of 180 degrees.

An axially adjustable fixed valve 160 (Figs. 3 and 4) has an externally threaded tubular stem portion 161 which is adapted to be screwed into the internally threaded tubular valve support portion 139 and is held in axially adjusted position therein by an externally threaded tubular locking member 162. A socketed recess 163, which may be of hexagonal cross sectional shape is provided in the upper end of the bore of the locking member 162 to receive an ordinary stud wrench, not shown. A hydraulic sealing ring 164 is mounted in a circumferential groove around the upper end of the locking member 162. The axially adjustable fixed valve 160 is provided with a head portion 165 having an upwardly facing seat 167 machined on its upper marginal portion.

A resilient sealing gasket 168, adapted to seat on the upwardly facing valve seat 167, is mounted in an annular groove in the lower end of a gasket support sleeve 169 which has a relatively thick lower portion 170 adapted to fit slidably within the lower end of a guide member 171 forming part of a resilient sealing means 172. The upper portion of the sleeve 169 is threaded externally with threads of the same pitch and hand as those on the fixed valve stem 101. The sleeve 169 is adapted to be screwed into axially adjusted position in a correspondingly internally threaded portion of the guide member 171.

A pair of lugs 173 extend inwardly from each side of the inner wall of the sleeve 169, and each pair of these lugs is adapted to receive freely between them one of a pair of vanes 174 extending radially from the fixed valve 160 above the head 165 thereof. The lugs 173 and vanes 174 secure the valve 160 and sleeve 169 together for common rotative movement.

The guide member 171 has a beveled, resilient container sealing gasket 175 seated in a groove around the under side of a rim portion 176 thereof, and also has a resilient sealing sleeve 178 mounted in a groove around the upper surface of the rim 176. The upper end of the resilient sealing sleeve 178 seats in an annular groove 179 surrounding the lower end of the hole 132 in the filler valve body 131 in the same manner as that described previously herein for the resilient sleeve 95 of the filler valve structure shown in Figs. 1 and 2. The guide member 171 has a hub portion 180 mounted for slidable movement on the tubular lower portion 139 of the insert 135. A plurality of liquid passage holes 181 are provided through the portion of the guide member connecting the hub portion 180 to the rim portion 176 thereof.

*Operation*

The mechanism shown in Fig. 1 is adapted to be operated either as a balanced or unbalanced system. For example, when operating as a balanced system vacuum is applied equally to the standpipes 94 and to the liquid in the tank 30 so that the flow of liquid into a container will be entirely by gravity flow. This arrangement is desirable when filling containers with cool or cold liquids.

When operating as an unbalanced system, vacuum is applied to the interior of the container being filled both before and during the introduction of liquids into the container but, during the actual filling operation, the vacuum passage to the source of vacuum is closed, and only the residual vacuum in the container and filling valve passages is employed. The liquid in the tank is exposed to atmospheric pressure in the unbalanced system. The latter system is preferable where a hot liquid fill is to be made.

Assuming, first, that the mechanism is to be used as an unbalanced system to supply hot brine solution to cans previously partly filled with spinach, the compartmented tank cover 50 is raised by means of the support arm 79 and the resilient sealing sleeves 95 are fitted onto the upper ends of the standpipes 94. Upon again lowering the cover assembly into sealing relation with the tank 30 the upper ends of the resilient sleeves 95 will be pressed into sealing engagement with the under side of the lower cover plate 53 around the holes 97 therein.

The vent plug 47 in the side of the tank is removed to admit air under atmospheric pressure to the interior of the tank 30, above the float-controlled liquid level therein. Also the plug is inserted in the 90 degree threaded vent hole 123 in the valve body 91. Vacuum is applied to the vacuum pipe 64 and is communicated through the passages 71 and the ports 74 to the interior of the cover compartment.

The liquid in the tank 30 tends to flow by gravity through the liquid passage 89, the downwardly opening passage 90 through the valve body, through the holes 112 in the guide member 110, and is normally sealed against passage beyond the resilient sealing gasket 113 by the contact therewith of the upwardly facing valve seat 104.

The mechanism is then actuated to rotate the turret B in a clockwise direction. The terms "clockwise" and "counterclockwise" as used herein are intended to mean "when viewed from above" unless otherwise stated. The cans or containers 88 are fed into the machine in a usual manner at a point in the rotative cycle of the turret B where the can lift is in its lowermost position and the valve core 119 in its normal initial or "off" position. In this initial position of the valve core 119 the radial passage 121 therein is located 90 degrees in a clockwise direction from a position of register with the vacuum passage 93, 180 degrees in the same direction from a position of register with the plug-sealed vent port 123, and 270 degrees in the same direction from a position of register with the open vent port 122.

As the lift roller 23 passes onto the intermediate vacuumizing portion 16 of the cam track 13, the mouth of the container 88 mounted on the lift is raised into sealing engagement with the beveled lower portion 114 of the sealing gasket 113. A spring 182 (Fig. 2) of the can lift assembly is placed under compression by this movement, but the spring 182 does not have sufficient force to elevate the sealing gasket 113 from the upwardly facing valve seat 104.

At this stage in the rotative cycle of the turret B the star wheel 124 is engaged by a first finger 125 to rotatively move the valve core 119 through an angle of 90 degrees in a counterclockwise direction. This brings the radial valve core passage 121 (Figs. 1 and 2) into registry with the vacuumized passage 93 and thence through the standpipe 94 with the vacuumized compartment of the tank cover 50. This withdraws the air from the container and places it under vacuum.

The star wheel 124 then engages a second finger 125 to rotate the core 119 through another angle of 90 degrees, which closes off the vacuum passage 93 and brings the radial valve core passage 121 into registry with the 90 degree offset port 123 through the valve body 91. This latter port, however, is sealed with a tapered plug as mentioned previously herein, so that the interior of the container and the passages communicating therewith remain vacuumized.

The lift roller 23 then passes onto the highest or liquid filling portion 26 of the cam track 13 which causes the lift spring 182 (Fig. 2) to bottom, and elevates the sealing gasket 113 from the upwardly facing seat 104 of the fixed valve 100 against the resilient pressure of the sealing means 105 to admit liquid into the vacuumized container. The liquid flows into the vacuumized container very rapidly since, in addition to its gravity head, the liquid in the tank 30 is exposed to atmospheric pressure. The vacuumized condition of the container tends to withdraw air which otherwise might remain in the can or its contents, and insures a proper fill.

The lift roller 23 then rides onto the next succeeding or venting portion 27 of the cam track 13, which permits the gasket 113 to close on the upwardly facing valve seat 104, but still retains the mouth of the container 88 in sealed relation with the beveled face 114 of the gasket. At this stage in the rotative cycle of the turret B, the star wheel 124 is again actuated to rotate the tapered valve core 119 through a further angle of 90 degrees in a counterclockwise direction which brings the radial core passage 121 into register with the open vent port 122. The admission of air under atmospheric pressure through the vent port forces any liquid which may remain in the core and associated passages downwardly into the container 88, and thereby prevents objectionable after-drip. The cam roller 23 next passes downwardly off the cam track, the filled container is removed from the left 22 in the usual manner, and the star wheel 124 again is engaged to rotate the core 119 through a final angle of 90 degrees in a counterclockwise direction to return it to its starting, sealed position.

Any liquid which may be drawn into the cover compartment by the vacuum therein drains downwardly through the upper drain ports 83 as they move into register with the pocketed recesses 84 in the valve core 60 and thence, upon further rotation of the housing 55, out of the lower drain ports 85 and back into the liquid in the tank 30.

For operation of the mechanism as a balanced system, the cover assembly 50 is elevated by means of the cover support arm 79, the resilient sleeves 95 are removed, and the cover 50 again is lowered to sealed position on the tank. The tapered plug 47 then is screwed into the vent hole 48 in the tank side wall 41, and vacuum is applied to the tank, and filling liquid is supplied thereto in the usual manner.

The 90 degree vent hole is left open in the balanced operation of the system which follows generally the procedure outlined previously herein for the unbalanced system. In the balanced system however, the fingers 125 for operating the star wheel 124 are positioned so that the first 90 degree rotative movement of the core occurs closely following the sealing of the mouth of the container against the beveled seat 114 on the sealing washer 113, and the second rotative movement of the core occurs after the lift roller 23 has passed onto the vent portion 27 thereof. The containers are fed in the usual manner onto the can lift 22 and are elevated to bring the mouth of the container into sealing engagement with the beveled seat 114 of the washer 113 when the cam roller 23 rides up onto the vacuumizing portion 16 of the cam track 13.

The first 90 degree rotative movement of the core 119 by means of the star wheel 124 communicates the interior of the container 88 through the hollow stem of the fixed valve 100, core passages 118 and 121, the vacuum passage 93 in the mounting ring 38, and the standpipe 94 with the vacuumized interior of the tank. The core remains in this position while the lift roller 23 rides onto the highest or filling portion 26 of the cam track, which raises the sealing ring 113 free from the upwardly facing valve seat 104 on the fixed valve 100 and admits the liquid from the tank into the container.

The vacuum communicated from the interior of the tank to the container through the passages in the valve core is the same as that to which liquid in the tank is subjected. Therefore, the liquid will flow by gravity through the passages 89 and 90 into the container 88 and into the standpipe to the same level as that of the liquid in the tank. After the lift roller 23 passes down onto the vent portion 27 of the cam track the valve core 119 is rotated through a second turn of 90 degrees thereby registering the radial core passage 121 with the 90 degree vent opening 123 from which the plug has been removed. This admits air under atmospheric pressure to clear the core and fixed valve stem passages of liquid, thereby preventing after-drip. The roller 23 then passes down off the cam track, lowering the container clear of the valve after which the container is removed from the machine in a usual manner.

In accordance with common practice the fixed valve head 103 projects into the container to displace a volume of liquid therein sufficient to leave a desired head space in the container when it is lowered away from the valve and the liquid has been released from the vent passages by the venting.

The modified form of valve shown in Figs. 3 to 6 inclusive, provides for simple and accurate adjustment of the valve which adds greatly to its utility, particularly when the valve is to be used interchangeably for supplying different types of liquid and is intended for use for both balanced and unbalanced operation. Since the general operation of the valve shown in Figs. 3, 4, 5 and 6 is substantially similar to that of the valve shown in Figs. 1 and 2, it will be unnecessary to repeat the description of the general cycle of operation of the apparatus with the former.

The adjustment of the head space in the form of valve shown in Figs. 3, 4, 5 and 6 is accomplished as follows: The valve core 154 is first lifted out of its seat and a usual form of plug wrench, not shown, is inserted in the hexagonal recess 163 in the tubular locking member 162 to free it from locking engagement with the end of the fixed valve stem 161. As mentioned previously herein, the pitch and hand of the threads on the sleeve 169 and on the fixed valve stem 161 are the same. Since these parts are interlocked for simultaneous rotative movement by the lugs 173 and interposed vanes 174, upon releasing the tubular locking member 162 from engagement with the end of the fixed valve stem 161, the valve 160 and its rotatively interconnected sleeve 169 may be screwed up or down to raise or lower the fixed valve head 165 and its sealing washer 168 carried on the sleeve 169 relatively to the container sealing washer 175 mounted on the guide member 171.

If it should be desired to adjust the position of the fixed valve 160 without changing the head space, the guide member 171 and valve head 165 can be turned together as a unit. The upper end of the resilient sleeve 178 would move slidably in its annular seat to permit such adjustment.

In addition to the features of the valve shown in Figs. 3, 4, 5 and 6 which thus facilitate adjustment of the head space and seating pressures exerted by the resilient seal 172, the modified form of valve core 154 and its associated insert 135 avoid the necessity of having an alternate 90 degree vent port 123 and sealing plug therefor. With the insert 135 keyed in the position for balanced operation of the system shown in Figs. 3 and 5, the vent port 148 in the neck 140 will be located 90 degrees in a counterclockwise rotative direction from the vacuumizing position of the radial core passage 158. With the insert 135 keyed in its alternate position, namely 90 degrees in a counterclockwise direction from its position shown in Figs. 3, 5, and 6, the vent port 148 will be located 180 degrees from the vacuumizing position of the core passage 158 for unbalanced operation of the system.

While I have described a preferred embodiment of the present invention it will be understood, however, that various changes and modifications may be made in the details thereof without departing from the spirit and scope of the appended claims.

Having thus described the invention what I claim as new and desire to protect by Letters Patent is as follows:

1. A container filling machine comprising a rotary liquid supply tank, a compartmented cover adapted to seal the interior of said tank from the atmosphere, a valve housing mounted on said cover, a valve mounted in said valve housing, to drain liquid from the cover compartment into the tank, means for openly connecting the cover compartment to a source of vacuum, a filler valve body mounted on said tank to rotate therewith, a liquid passage extending downwardly from said tank through said valve body and having a downwardly opening outlet, sealing means surrounding the outlet from said liquid passage, means for moving a container to position its mouth in sealed relation with said sealing means, valve means mounted to control the flow of liquid through said liquid passage, vacuum communicating means normally communicating said valve body with said vacuumized cover compartment, valve means mounted alternately to communicate a container mounted with its mouth sealed to said sealing member with said vacuum communicating means and with the atmosphere, said vacuum communicating means having a removable portion adapted to communicate the interior of the cover compartment with the liquid supply tank, and said tank having a removable portion adapted to communicate the interior of the tank with the atmosphere.

2. A container filling machine comprising a liquid supply tank, a sealed compartmented cover adapted to seal the interior of said tank from the atmosphere, means for connecting the cover compartment to a source of vacuum, a filler valve body mounted on said tank, a liquid passage extending downwardly from said tank through said valve body, means for sealing the mouth of a container around the outlet end of said liquid passage, means for controlling a flow of liquid from the tank into a container having its mouth so sealed, valve controlled means mounted alternately to communicate a container mounted with its mouth so sealed with said cover compartment and with the atmosphere, and a removable sleeve adapted to be mounted to seal off communication between the cover compartment and the tank and to be removed to communicate the interior of the cover compartment with the interior of the tank.

3. A container filling machine comprising a liquid supply tank, a compartmented cover mounted on said tank and sealed thereto, said tank being normally in open communication with said cover compartment, means for connecting the cover compartment to a source of vacuum, a filler valve body mounted adjacent said tank, a liquid passage extending downwardly from said tank through said valve body, means for sealing the mouth of a container to the valve body around the outlet end of said liquid passage, means for controlling a flow of liquid from the tank into a container having its mouth so sealed, a removable seal mounted to close off communication between the tank and the cover compartment, and valve controlled means mounted alternately to communicate a container having its mouth so sealed with said cover compartment and with the atmosphere.

4. In a container filling machine for selective use as a balanced and unbalanced filling system, a liquid supply tank, means for maintaining liquid at a predetermined level therein, a vacuum compartment separated from said tank and above the liquid level therein, means for connecting said compartment to a source of vacuum, a filler valve body mounted below the liquid level in said tank, a liquid passage communicating from the liquid in said tank through said valve body, valve means mounted to control the flow of liquid through said valve body, means for elevating a container toward said filler valve, means for sealing the mouth of a container so elevated to said filler valve body, a vacuum passage communicating from the interior of a container so sealed to said vacuum compartment, a valve mounted to control fluid flow in the vacuum passage, means for opening the vacuum passage control valve with a container sealed to said filler valve body, means for closing the vacuum control valve at a predetermined height above the container mouth, means for opening the liquid control valve to admit liquid to the container and to the vacuum passage below said vacuum control valve, means for closing the liquid control valve, means for venting the vacuum passage to the atmosphere to release liquid from the vacuum passage below the valve level therein for flow back into the container, and means for lowering the container away from the filler valve body.

5. In a container filling machine for selective use as a balanced and unbalanced filling system, a liquid supply tank, means for sealing the interior of the tank from the atmosphere, means for maintaining liquid at a predetermined level in said tank, a vacuum compartment communicating with said tank above the liquid level therein, means for connecting the vacuum compartment to a source of vacuum, a filler valve body mounted below the liquid level in said tank, a liquid passage establishing communication from the liquid in said tank through said valve body, means mounted to control the flow of liquid through said valve body, means for sealing the mouth of a container to said filler valve body, a vacuum passage communicating from the interior of a container so sealed to the interior of said tank above the liquid level therein, means for sealing said vacuum passage from said tank and communicating it directly to the interior of said vacuum compartment, and means for venting said tank.

6. In a container filling machine for selective use as a balanced and unbalanced filling system, a liquid supply tank, means for selectively venting said tank and for sealing the interior of the tank from the atmosphere, means for maintaining liquid at a predetermined level in said tank, a vacuum compartment, means for connecting the vacuum compartment to a source of vacuum, a filler valve body mounted below the liquid level in said tank, a liquid passage communicating from the liquid in said tank through said valve body, means mounted to control the flow of liquid through said valve body, means for sealing the mouth of a container to said filler valve body around the outlet of said liquid passage, a vacuum passage communicating from the interior of a container so sealed through the interior of said tank and to the interior of said vacuum compartment, and removable sealing means for communicating the interior of said passage with the interior of said tank above the liquid level therein.

7. In a container filling machine a vented liquid supply tank, a sealed cover compartment adapted to be mounted over said liquid supply tank, a vacuum passage connected from a source of vacuum into said cover compartment to vacuumize said compartment, sealed drain means mounted to return liquid from the vacuumized cover compartment into the liquid supply tank, a plurality of standpipes mounted in said tank and terminating short of said cover beneath a plurality of correspondingly arranged openings in said cover compartment, a resilient sleeve mounted on each standpipe to be pressed into sealing, encircling engagement with the cover around one of said cover openings to provide individual sealed communication between the standpipes and the interior of the cover compartment, and filler valve means mounted to communicate the standpipes and the liquid in said tank to containers to be filled.

8. In a container filling machine a liquid supply tank having a vent opening therein, means for sealing said vent opening, a sealed cover compartment adapted to be mounted in sealing relation to said liquid supply tank, means for rotating said tank and said cover as a unit, a valve member having a seat thereon mounted coaxially in said cover compartment, a stationary valve member mounted on said seat, a vacuum passage connected through said valve member and seat into said cover compartment, sealed pocketed drain means in said valve to drain liquid from the cover compartment into the tank, a plurality of standpipes mounted in said tank and terminating short of said cover beneath a plurality of correspondingly arranged openings in said cover compartment, a removable resilient sleeve adapted to be mounted on each standpipe to be pressed into sealing, encircling engagement with the cover around its corresponding cover opening to provide sealed communication between the standpipes and the interior of the cover compartment, the sleeves being adapted to be removed when the tank vent is sealed for balanced operation, and to be mounted on said standpipes when the tank vent is open for unbalanced operation, and filler valve means mounted to rotate with the tank and cover for communicating the vacuumized standpipes and the liquid in said tank to containers.

9. In a container filling machine for selective use as a balanced and unbalanced filling system, a liquid supply tank having a sealable vent therein, means for maintaining liquid at a predetermined level in said tank, a vacuum compartment communicating with said tank above the liquid level therein, means for selectively sealing off communication between the vacuum compartment and the tank, a filler valve connected to said tank for controlled gravity discharge of liquid from said tank, means for sealing the mouth of a container to said filler valve to receive liquid discharged therethrough, and means for selectively openly connecting the interior of a container sealed to said filler valve to the vacuum compartment and to the liquid supply tank.

10. In a container filling machine for selective use as a balanced and unbalanced filling system, a liquid supply tank having a sealable vent therein, means for maintaining liquid at a predetermined level in said tank, a vacuum compartment communicating with said tank above the liquid level therein, a filler valve connected to said tank for controlled gravity discharge of liquid from said tank, means for sealing the mouth of a container to said filler valve to receive liquid discharged therethrough, said tank and said vaccum compartment openly communicating with each other through a first passage, said tank and the interior of a container sealed to said filler valve openly communicating with each other through a second passage, and means for selectively sealing said passages into a continuous passage opening from the interior of a container sealed to said filler valve into said vacuum compartment and sealed from said tank.

11. In a container filling machine, a filler valve comprising a body portion having an opening therein adapted to communicate with a tank of liquid, a hollow valve stem rigidly supported in said body portion to extend downwardly through said liquid opening, a valve head carried by said stem, an upwardly facing valve seat on said valve head, a seat formed to surround said liquid opening, resiliently compressible conduit means disposed in compression between said upwardly facing valve seat and the seat surrounding said liquid opening, a portion of said conduit means being disposed beyond the valve seat, a valve seat formed in said body portion and having passages opening therefrom respectively to a source of vacuum and to the atmosphere, a movable valve member seated on said latter valve seat and having an opening therein communicating with the interior of said hollow valve stem, means for rotatively moving said latter valve alternately to connect said hollow valve stem to said vacuum source and to the atmosphere, and means for moving the mouth of a container into sealed engagement with the portion of said resilient conduit means beyond the upwardly facing valve seat to elevate the resilient conduit means from the upwardly facing valve seat.

12. In a container filling machine, a filler valve comprising a body portion having a liquid passage therethrough, a valve seat formed in said body portion, a vacuum passage opening from said valve seat and adapted to be connected to a source of vacuum, a vent opening in said seat, a movable valve member seated on said seat and having a passage therein adapted alternately to communicate with said vacuum passage and with said vent, a fixed valve having a head portion thereof mounted beneath the outlet from said liquid passage, resilient sealing means mounted to surround the outlet from said liquid passage and adapted to seat on said valve head, means for moving a container to bring its mouth into sealed relation with said resilient sealing means, means for actuating said movable valve to communicate the interior of a container having its mouth so sealed with said vacuum passage, means for moving the container against the resilient seal to displace said seal from said valve head to admit liquid to fill the container and to elevate a quantity of such liquid above the container into the passage of said movable valve member, means for lowering the container to seat the resilient sealing means on the valve head, and means for actuating the movable valve to vent the valve passage, thereby to release into the container liquid elevated above the container.

13. In a container filling machine, a vacuum filler valve comprising a valve body, a liquid passage therethrough, an insert adapted to be fixed in either of two angularly adjusted positions in said valve body, a valve seat on said insert, said insert having a vent port therein opening into said valve seat, a vacuum connected passage in said valve body, a pair of vacuum passages in said valve insert adapted to communicate selectively between said body vacuum passage and said valve seat, a valve member seated on said insert valve seat and having ports therein adapted to register selectively with said vacuum passages in said insert and with said vent port in said insert in predetermined positions of said valve member, a fixed valve mounted in said insert to extend downwardly through the outlet of said liquid discharge passage in said body, a relatively large head on said fixed valve, resilient sealing means interposed between said valve body and said valve head normally to seal off the flow of liquid from said liquid passage, said resilient sealing means being adapted to have sealing engagement with the mouth of a container elevated into engagement therewith, said valve head being adapted to extend into the container to displace a volume of liquid therein, the portion of said sealing means engaging said valve head being adjustable relatively to said container sealing means to vary the amount of liquid displaced by said valve head.

14. In a container filling machine a filler valve body, a liquid passage therethrough, a valve adjustably carried by said valve body and having a head portion thereof mounted adjacent the outlet of said liquid discharge passage in said body, first sealing means adjustably carried by said valve body and interposed between said filler valve body and said valve head normally to seal off the flow of liquid through said liquid passage, second sealing means carried by said valve body and adapted to have sealing engagement with the mouth of a container elevated into engagement therewith, said valve head being adapted to extend into a container so sealed to displace a volume of liquid therein, the coordinated adjustment of said valve and said first sealing means relative to said valve body being effective to vary the amount of liquid displaced by said valve head.

15. In a container filling machine a vented liquid supply tank, a sealed cover compartment adapted to be mounted over said liquid supply tank, a vacuum passage connected from a source of vacuum into said cover compartment to vacuumize said compartment, a standpipe mounted in said tank and terminating short of said cover beneath a correspondingly arranged opening in said cover compartment, a resilient sleeve mounted on said standpipe to be pressed into sealing engagement with the cover in a manner encircling said cover opening to provide sealed communication between said standpipe and the interior of said cover compartment, and filler valve means mounted to communicate the standpipe and the interior of said tank to a container to be filled.

16. In a container filling machine, a filler valve body having an opening therethrough defining a liquid passage, said opening being internally threaded adjacent one end thereof, a first sealing member mounted on said valve body and adapted to having sealing engagement with the mouth of a container elevated into engagement therewith, an externally threaded retainer ring in screwed engagement with the internally threaded portion of the opening in said body, a second sealing member carried by said retainer, a valve disposed in said liquid passage and mounted for threaded adjustment longitudinally of said valve body, said valve having a seating portion adapted to engage said second sealing member to seal off the flow of liquid from the valve body, and means connecting said retainer ring and said valve for simultaneous adjustment relative to said valve body while permitting relative longitudinal movement between said retainer and said valve.

17. In a container filling machine for selective use as a balanced or as an unbalanced system, a liquid supply tank having an opening providing a vent to atmosphere, a source of vacuum, a filler valve mounted below said supply tank and in flow communication therewith, means for supporting a container in sealed engagement with said valve to receive liquid therefrom when said valve is in open position, a conduit communicating the interior of said container with said source of vacuum, and means for converting said machine for use as a balanced system including seal means for closing said vent opening and means for connecting said tank to said source of vacuum.

18. In a container filling machine for selective use as a balanced or as an unbalanced system, a liquid supply tank having an opening providing a vent to atmosphere, a source of vacuum, a filler valve mounted below said supply tank and in flow communication therewith, means for supporting a container in sealed engagement with said valve to receive liquid therefrom when said valve is in open position, a conduit extending through said tank and communicating the interior of said container with said source of vacuum, and means for converting said machine for use as a balanced system including a removable plug for closing said vent opening and means for disconnecting said conduit from said source of vacuum at a point inside said tank whereby to communicate said tank with said source of vacuum.

WILLIAM DE BACK.

References Cited in the file of this patent

UNITED STATES PATENTS

| Number | Name | Date |
|---|---|---|
| 1,355,016 | Thompson | Oct. 5, 1920 |
| 1,877,927 | McGhee | Sept. 20, 1932 |
| 2,364,400 | Stewart et al. | Oct. 5, 1944 |
| 2,436,812 | Kerr | Mar. 2, 1948 |

FOREIGN PATENTS

| Number | Country | Date |
|---|---|---|
| 613,282 | Germany | May 16, 1935 |